(12) United States Patent
Sato

(10) Patent No.: US 7,359,999 B2
(45) Date of Patent: Apr. 15, 2008

(54) INPUTTING METHOD AND DEVICE WITH A FLAT INPUT HAVING SENSOR CAPABLE OF COORDINATE TOUCH INPUT WHEREIN DISPLAY IS SWITCHABLE BASED ON TOUCH PRESSURE

(75) Inventor: Tadamitsu Sato, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 401 days.

(21) Appl. No.: 10/865,033

(22) Filed: Jun. 10, 2004

(65) Prior Publication Data

US 2005/0007339 A1    Jan. 13, 2005

(51) Int. Cl.
*G06F 13/00* (2006.01)
*G09G 5/00* (2006.01)

(52) U.S. Cl. .............................. 710/67; 710/15; 710/16; 710/36; 345/156; 345/168; 345/169; 345/172; 345/178; 382/141; 382/149

(58) Field of Classification Search .................. 710/15, 710/16, 36, 67; 345/173, 178, 168, 172, 345/169, 156; 382/141, 149
See application file for complete search history.

(56) References Cited

U.S. PATENT DOCUMENTS

| | | | |
|---|---|---|---|
| 6,239,790 B1 * | 5/2001 | Martinelli et al. | 345/174 |
| 6,683,599 B2 * | 1/2004 | Shepherd et al. | 345/168 |
| 6,704,005 B2 * | 3/2004 | Kato et al. | 345/173 |
| 6,922,481 B2 * | 7/2005 | Masuda et al. | 382/141 |
| 6,992,658 B2 * | 1/2006 | Wu et al. | 345/169 |
| 7,002,553 B2 * | 2/2006 | Shkolnikov | 345/169 |
| 7,015,896 B2 * | 3/2006 | Levy et al. | 345/168 |

* cited by examiner

*Primary Examiner*—Tammara Peyton
(74) *Attorney, Agent, or Firm*—Brinks Hofer Gilson & Lione

(57) ABSTRACT

An input device includes a flat first input unit for a first input operation, a second input unit for a second input operation, a display unit having a display portion displaying data, and a control unit controlling each unit. The control unit gives an operator feedback by provisionally displaying input data obtained from the first input operation, and then confirms the input by the second input operation.

3 Claims, 9 Drawing Sheets

INPUTTING METHOD AND DEVICE WITH A FLAT INPUT HAVING SENSOR CAPABLE OF COORDINATE TOUCH INPUT WHEREIN DISPLAY IS SWITCHABLE BASED ON TOUCH PRESSURE

This application claims the benefit of priority to Japanese Patent Application Nos. 2003-167958, 2004-105861 and 2004-170144, herein incorporated by reference.

BACKGROUND OF THE INVENTION

1. Field of the Invention

The present invention relates to an inputting method and an input device suitable to perform an input operation surely by pressing of an operator.

2. Description of the Related Art

A flat input device is used as an input device for electric devices such as a mobile phone and a personal digital assistant (PDA).

As an example of such an input device, there is given a flat input device including a capacitance sensor or a pressure sensor and capable of coordinate input. In the input device including a capacitance sensor or a pressure sensor (hereinafter referred to simply as "sensor"), input of a numerical value or a symbol is achieved with just a single touch of the sensor. Therefore, an operator has no sensation of performing an input operation and unintended inputting errors tend to occur.

To solve this problem, an input device is disclosed. The input device has a switch in addition to a sensor. The switch is disposed behind the sensor. The switch responds to a pressing operation of an operator by reaction force. The input device thus makes the operator realize that an input operation is performed, thereby preventing inputting errors. The input device is disclosed in, for example, Japanese Unexamined Patent Application Publication No. 2002-123363.

Although the known input device can make an operator realize that an input operation is performed, it has a problem in which what is input is not known until the operator looks at a display displaying the input result (confirmed input) as data (output of the input device).

That is to say, the known input device has a problem in which it is impossible to know whether the input operation is correct or not before looking at the displayed data and therefore an inputting error can occur. The inputting error is that the region actually pressed is different from the intended region, for example, that an adjacent region is pressed by mistake. The smaller the operating portion is, the more often such an inputting error occurs. In the case where such an inputting error occurs, it is necessary to perform a corrective input operation, that is to say, to delete the input data and then to input it again. This is less user-friendly.

Therefore, an inputting method and an input device with which an operator can perform a correct input operation surely and easily and which are user-friendly are needed.

SUMMARY OF THE INVENTION

Embodiments of the present invention provide an inputting method and an input device with which an operator can perform a correct input operation surely and easily.

According to one aspect of the present invention, there is provided an inputting method to input data with a flat input unit including a capacitance sensor or a pressure sensor and capable of coordinate input and to display the input data with a display unit. The inputting method includes the steps of giving an operator feedback by provisionally displaying input data obtained from a first input operation, and confirming the input by a second input operation. Since the operator can know the unconfirmed input data in advance by the provisional display, inputting errors are prevented surely and easily.

According to another aspect of the present invention, there is provided an input device including a flat first input unit including a capacitance sensor or a pressure sensor and capable of coordinate input, at least one second input unit disposed behind the first input unit and switchable by pressing force when the first input unit is pressed, and a control unit controlling each unit in the input device. The input device further includes a display unit having a display portion displaying data, the display unit being integrated with or separated from the control unit. The control unit allows the display unit to provisionally display input data obtained from a touch operation of the first input unit, and confirms the input by an operation of the second input unit. Since an operator is given feedback by provisionally displaying input data obtained from a first input operation of the first input unit and then the input is confirmed by a second input operation of the second input unit, the operator can know the unconfirmed input data in advance by the provisional display. Therefore, inputting errors are prevented surely and easily.

It is preferable that the first input unit include an input key on the surface thereof. In addition, it is preferable that the at least one second input unit include one second input unit, and the second input unit confirm the coordinate input through the first input unit.

DESCRIPTION OF THE PREFERRED EMBODIMENTS

The preferred embodiments of the present invention will now be described with reference to the drawings.

Figure 1:
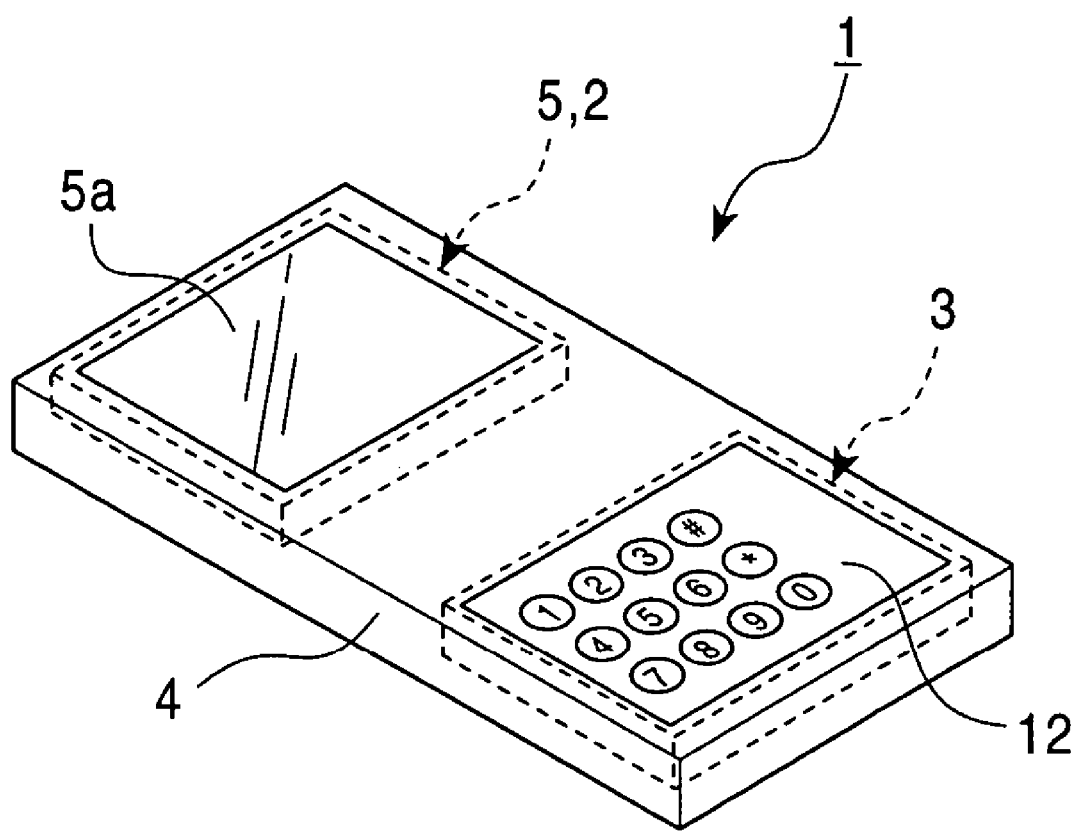
FIG. 1 is a schematic perspective view showing the main part of a first embodiment of an input device to which an inputting method of the present invention is applied.
Figure 2:
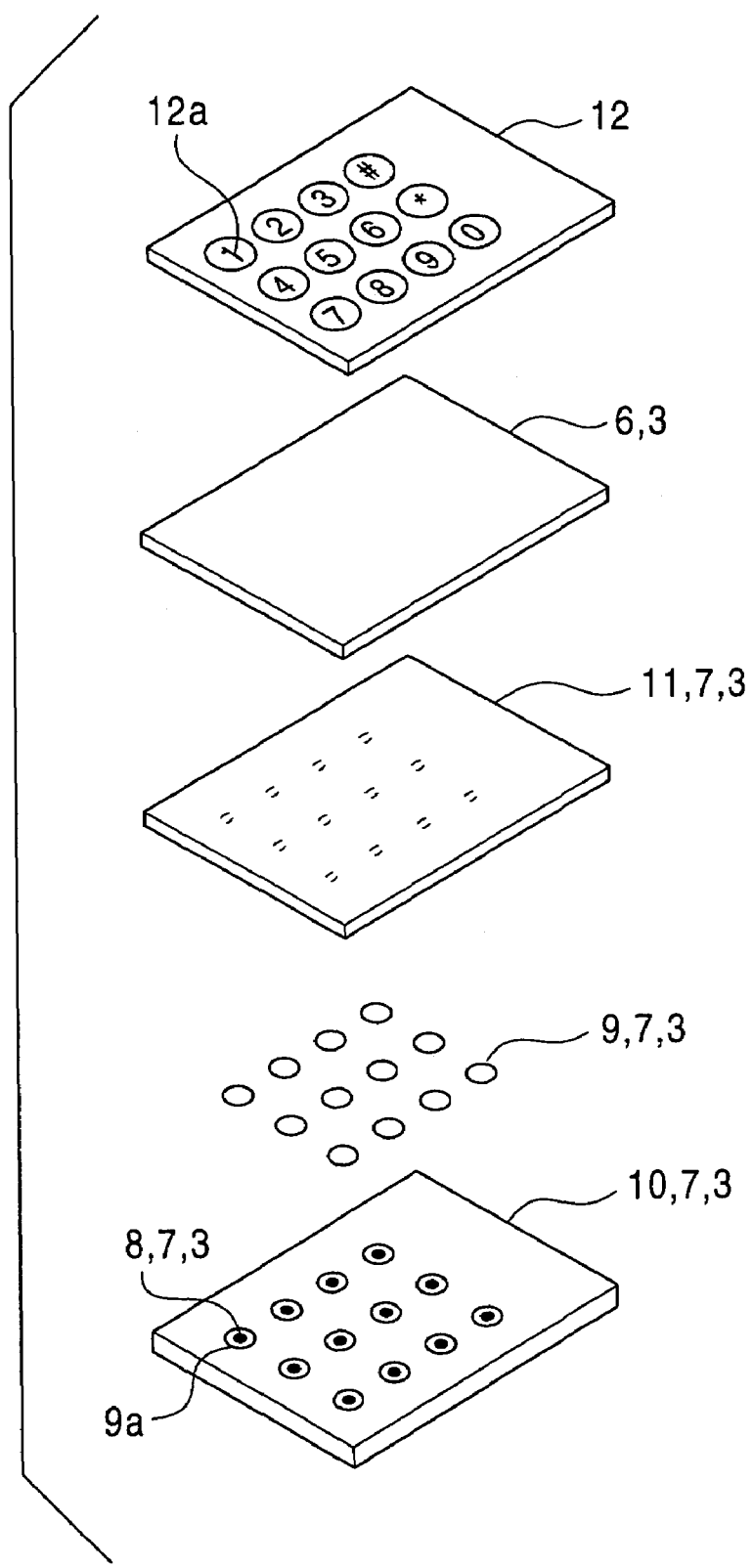
FIG. 2 is a schematic enlarged exploded perspective view of the main part of an input unit of the input device of FIG. 1.
Figure 3:
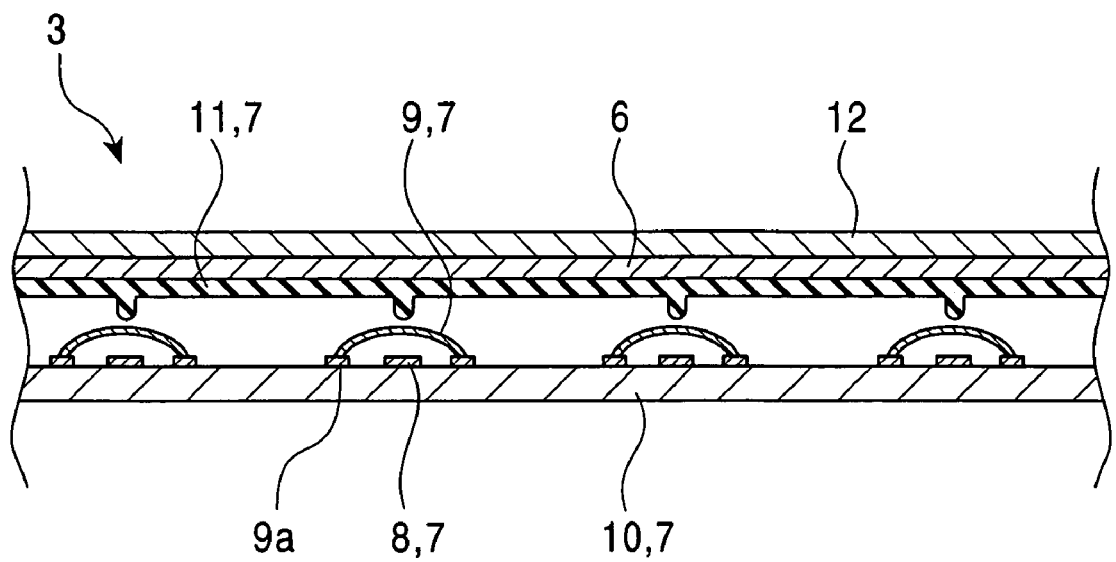
FIG. 3 is a schematic enlarged vertical sectional view of the main part of the input unit of the input device of FIG. 1.
Figure 4:
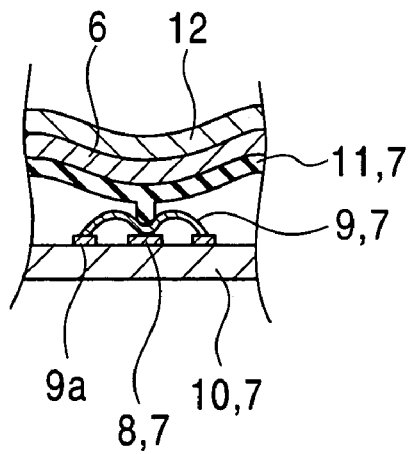
FIG. 4 is an explanatory view showing the ON operation state of a second input switch of the input device of FIG. 1.
Figure 5:
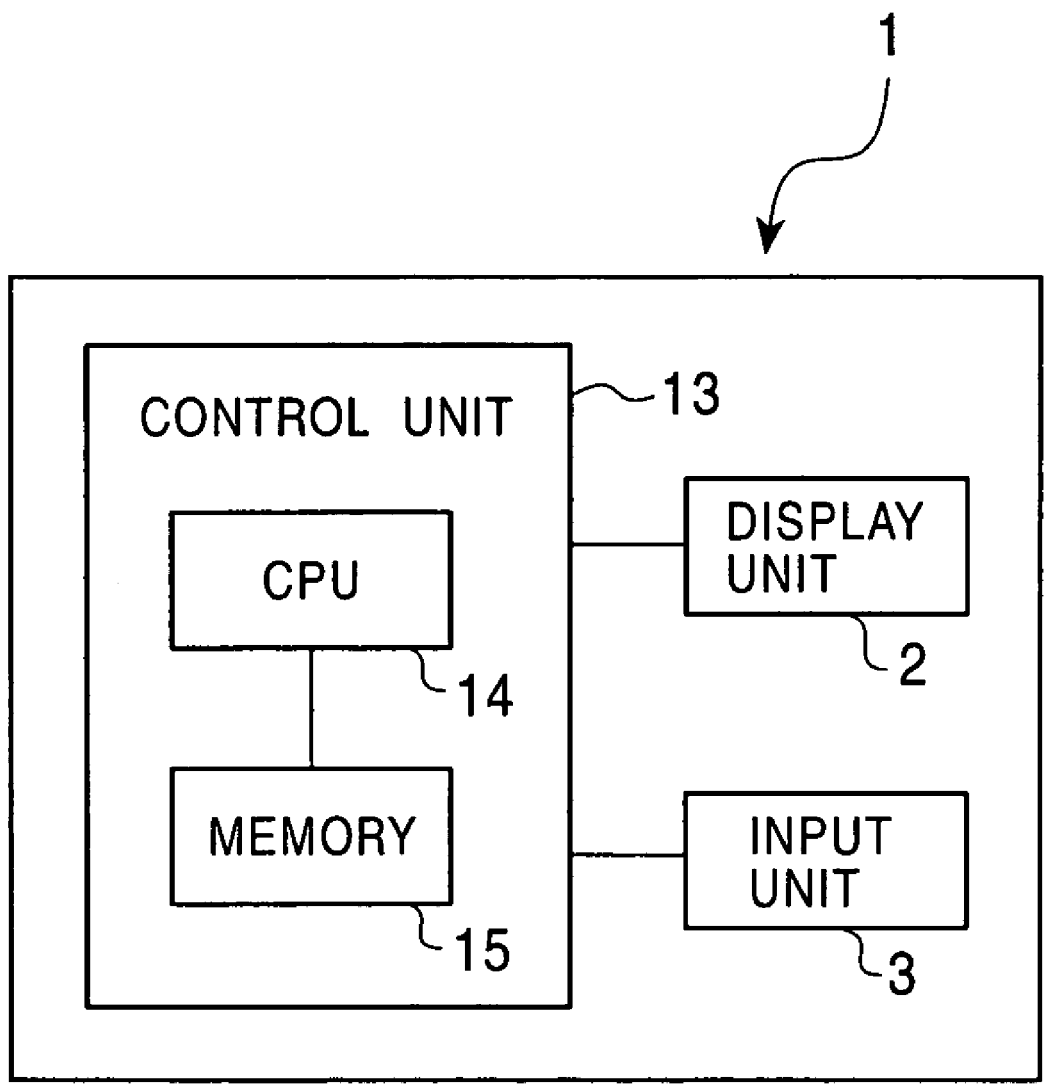
FIG. 5 is a functional block diagram of the input device of FIG. 1.

FIGS. 1 to 5 show a first embodiment of the present invention. FIG. 1 is a schematic perspective view showing an input device. FIG. 2 is a schematic enlarged exploded perspective view of the main part of an input unit. FIG. 3 is a schematic enlarged vertical sectional view of the main part of the input unit. FIG. 4 is an explanatory view showing the ON operation state of a second input switch. FIG. 5 is a functional block diagram of the input device.

As shown in FIG. 1, the input device 1 of the present invention has a display unit 2 and an input unit 3. The display unit 2 and the input unit 3 are accommodated in a case 4. The case 4 has a predetermined shape in accordance with the intended use such as a main body case for a mobile phone.

The display unit 2 is for displaying at least input data obtained from an input operation. As the display unit 2, a display panel 5 is used. The display panel 5 has a display portion (display region) 5a that displays data. The input data for a key 12a of a key sheet 12 (to be hereinafter described) of the input unit 3 can be displayed at a corresponding position in the display portion 5a.

The display panel 5 is selected from known panels such as a liquid crystal display panel and an organic electroluminescent display panel according to needs such as design concept.

The display by the display unit 2 is selected from monochrome display, multicolor display, and full color display according to needs such as device specification and design concept.

The display portion 5a of the display panel 5 is selected according to needs such as design concept from the following: a display portion 5a capable of being switched between a provisional display mode and a final display mode; a display portion 5a including a provisional display region and a final display region; and a display portion 5a displaying the same graphics as the input unit 3, a portion of the graphics corresponding to the provisionally input data being highlighted.

The input unit 3 is for inputting data. As shown in FIGS. 2 and 3, the input unit 3 has a first input sensor 6 and second input switches 7. The first input sensor 6 functions as a first input unit for the first input operation. The second input switches 7 function as second input units for the second input operation confirming the input.

As the first input sensor 6, a flat sensor including a capacitance sensor or a pressure sensor and capable of coordinate input is used.

An example of a capacitance sensor is described in Japanese Unexamined Patent Application Publication No. 2001-344064 herein incorporated by reference. X-direction sensing electrodes and Y-direction sensing electrodes which are made of Ag (silver) base paste are arranged in a matrix form in opposed relation to each other, with a resin sheet sandwiched therebetween. The resin sheet is made of polyethylene terephthalate (PET) and the like, and has insulation properties and a predetermined dielectric constant. The resin sheet is disposed on a board with a conductive pattern. The electrodes are connected to the conductive pattern. A touch of a dielectric material such as a finger on the surface of the sensor causes a change of capacitance between the X-direction sensing electrodes and the Y-direction sensing electrodes at the touch position, enabling input from the X-Y coordinate.

The pressure sensor includes, for example, a resistor to which a potential difference is applied in X and Y directions, and a conductive member facing the resistor. Pressing the surface of the sensor brings the conductive member into contact with the resistor and enables coordinate input because of a change of resistance values.

In this embodiment, twelve second input switches 7 are provided. The second input switches 7 are disposed behind the first input sensor 6. When an operator presses the surface of the first input sensor 6 with a finger, one of the switches 7 performs switching by the pressure force.

The twelve switches 7 are arranged in a matrix with four columns and three rows. Each switch has a fixed electrode 8 and a movable electrode 9. The twelve pairs of fixed electrodes 8 and movable electrodes 9 are capable of coming into contact with each other separately.

The fixed electrodes 8 are circular and disposed on a printed circuit board 10 disposed behind the first input sensor 6 (FIG. 3). On the circuit board 10, movable electrode terminals 9a are also provided. The terminals 9a are rings surrounding the fixed electrodes 8. The fixed electrodes 8 and the movable electrode terminals 9a are connected electrically to a predetermined conductive pattern (not shown) on the printed circuit board 10, in a known manner.

The movable electrodes 9 are disposed so as to face the fixed electrodes 8 and connected electrically to the movable electrode terminals 9a on the printed circuit board 10 (FIG. 3).

The shape of the fixed electrodes 8, the movable electrodes 9, and the movable electrode terminals 9a may be selected from known shapes according to needs such as design concept.

Behind the first input sensor 6, a stem sheet 11 (a sheet having projections) made of insulating resin is disposed. As shown in FIG. 4, when the first input sensor 6 is pressed with a finger and the like, a projection of the stem sheet 11 makes a movable electrode 9 come into contact with the corresponding fixed electrode 8.

The number of the second input switches 7 may be determined according to needs such as design concept.

As shown in FIGS. 2 and 3, the surface of the first input sensor 6 is covered with a key sheet 12. The key sheet 12 is made of resin such as PET or silicon rubber. A plurality of keys 12a are provided by printing or transfer on the surface of the key sheet 12. Each key 12a consists of a character such as a letter, a number, and a symbol to be input by touch of the key; and a circle surrounding the character. In this embodiment, twelve keys, that is to say, ten numeric keys: 0 to 9 and two symbol keys: # and * are provided by printing or transfer. The number and position of the keys 12a correspond to those of the second input switches 7.

The keys 12a may be printed on a flat surface of the key sheet 12, may be printed on concavities or convexities formed on the surface of the key sheet 12, or may be printed on convexities formed of elastic such as rubber on the surface of the key sheet 12.

The key sheet 12 is provided according to needs such as design concept. That is to say, the input device 1 may do without the key sheet 12, or more specifically, the keys 12a. In this case, it is preferable to cover the surface of the first input sensor 6 with a protective sheet.

As shown in FIG. 5, the input device 1 of this embodiment has a control unit 13 for controlling operation of each unit.

The control unit 13 is electrically connected with at least the display unit 2 and the input unit 3.

That is to say, in the input device 1 of this embodiment, the display unit 2 is integrated via a wire as a transmission line with the control unit 13, or more specifically, with the first input sensor 6 as a first input unit, the second input switches 7 as second input units, and the control unit 13.

The control unit 13 has at least a CPU 14, and a memory 15 such as ROM and RAM with an appropriate capacity. The memory 15 stores at least programs and data necessary for executing the inputting method in which the input data obtained from a touch operation of the first input sensor 6 is displayed provisionally on the display portion 5a of the display unit 2 and then the input is confirmed by an operation of the second input switches 7.

The inputting method will be described more specifically. The input data obtained from a touch operation of the first input sensor 6 is converted into output data used for display corresponding to the input data. The output data are sent to the display unit 2 and displayed provisionally at a predetermined position of the display portion 5a of the display unit 2. The provisional display is performed by blinking, difference in luminance, or difference in color. Then, the input is confirmed by the ON operation of the second input switch 7 and the provisional display is changed into a predetermined final display. The confirmed input data may be stored sequentially in a predetermined area of the memory 15.

The memory 15 stores various programs such as a program performing power-on initializing, and various data such as data necessary for performing display and past data obtained from input operation.

It is preferable that the memory 15 store a program for switching two different input modes: a key input mode and a coordinate input mode.

If a touch of any key 12a continues for a predetermined time period, the program switches to the key input mode. In this mode, corresponding to a key 12a, an input signal is provided to the first input sensor 6. Based on this input signal, an output signal corresponding to a letter, a number, or a symbol is produced. At a predetermined position of the display portion 5a of the display unit 2, the letter, the number, or the symbol is displayed provisionally. If the second input switch 7 corresponding to the key 12a is operated, the data displayed provisionally are confirmed as input data and stored.

If the touched position in the first input sensor 6 is moved within the predetermined time period, the coordinate input mode is selected. In this mode, coordinate data is produced from a track of a finger and the like on the first input sensor 6. In addition, an output signal is produced corresponding to the coordinate data. At a predetermined position of the display portion 5a of the display unit 2, graphics showing the track corresponding to the input is displayed provisionally. If the second input switch 7 corresponding to a predetermined key 12a is operated, the coordinate data displayed provisionally are confirmed as input data and stored.

The operation of the above embodiment will now be described together with inputting method.

Figure 6:
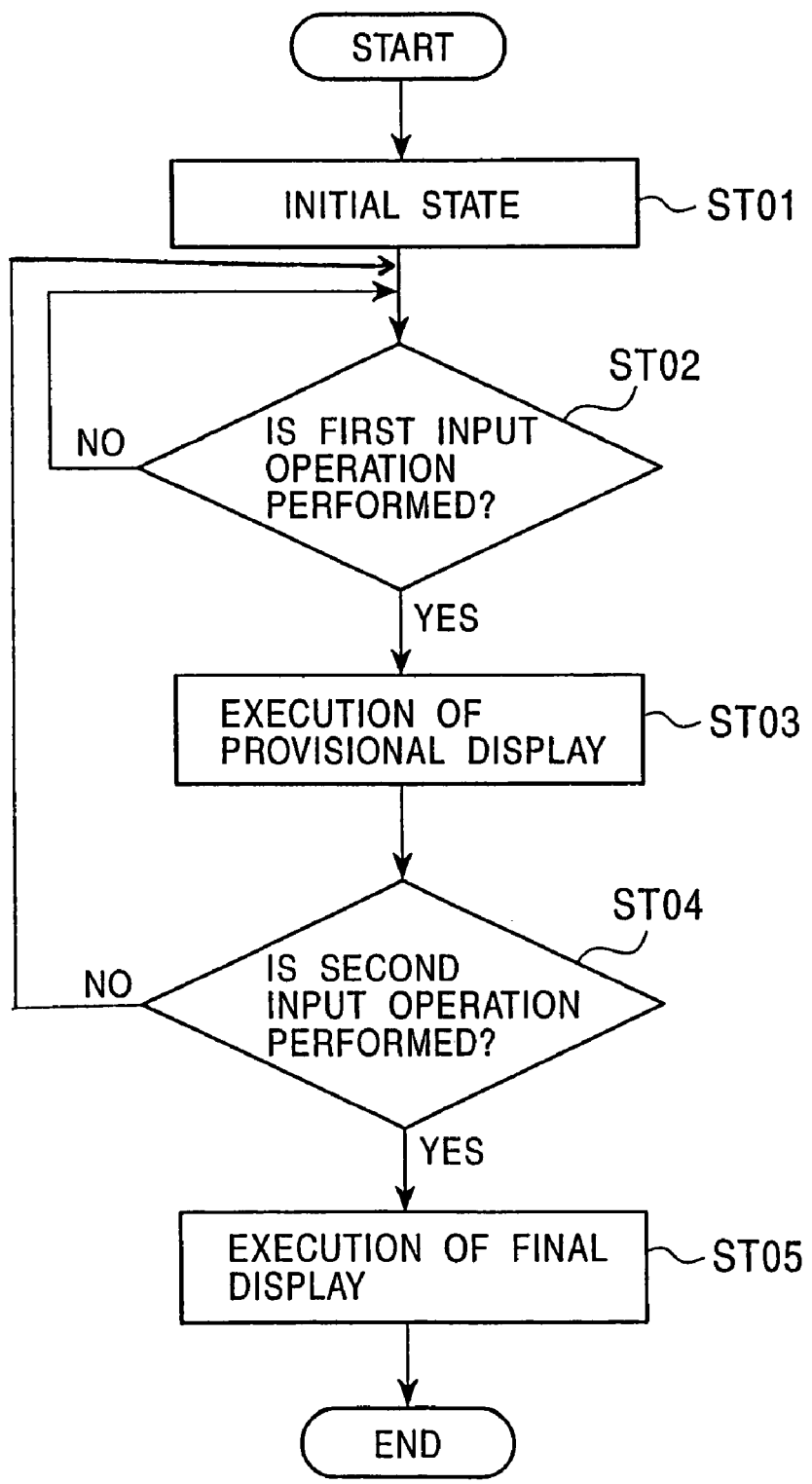
FIG. 6 is a flow chart showing an embodiment of an inputting method of the present invention.
Figure 7:
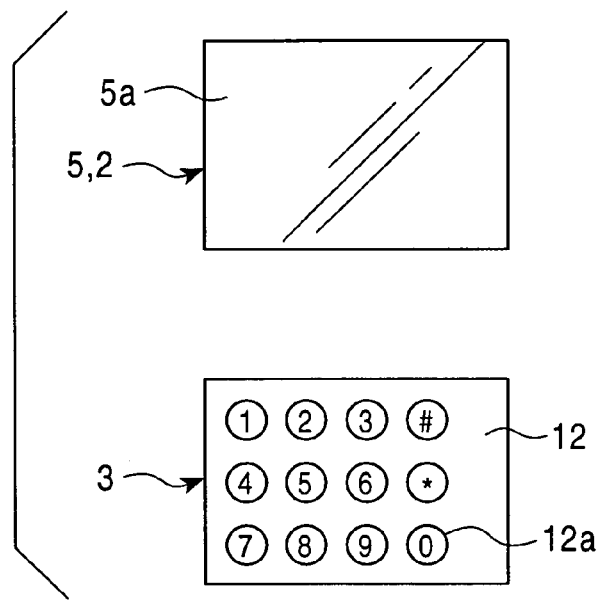
FIG. 7 is an explanatory view of the initial state of an input unit and a display unit in the embodiment of an inputting method of the present invention.
Figure 8:
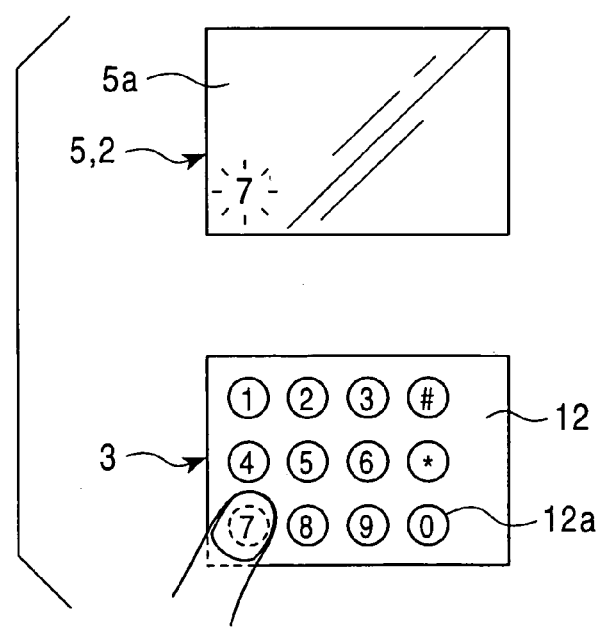
FIG. 8 is an explanatory view of a first input operation state in the embodiment of an inputting method of the present invention.
Figure 9:
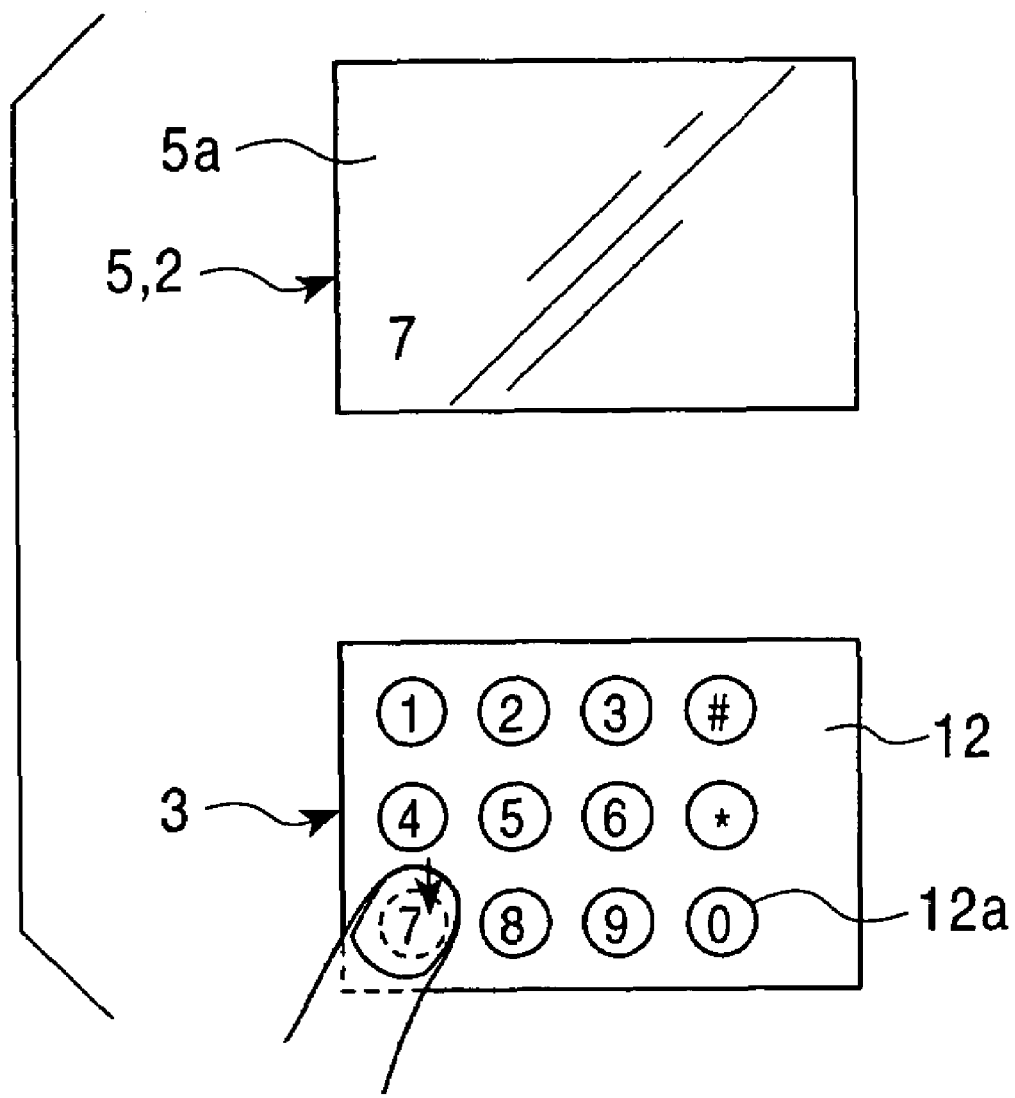
FIG. 9 is an explanatory view of a second input operation state in the embodiment of an inputting method of the present invention.

FIG. 6 is a flow chart showing an embodiment of inputting method of the present invention. FIG. 7 is an explanatory view of the initial state of the input unit and the display unit in the embodiment of inputting method of the present invention. FIG. 8 is an explanatory view of a first input operation state in the embodiment of inputting method of the present invention. FIG. 9 is an explanatory view of a second input operation state in the embodiment of inputting method of the present invention.

The inputting method with the input device 1 of this embodiment is in the key input mode.

As shown in FIG. 6, the inputting method of this embodiment is in the initial state in step 01. In this initial state, as shown in FIG. 7, the input unit 3 is not operated and nothing is displayed on the display portion 5a of the display panel 5 as the display unit 2. The fixed electrodes 8 and the movable electrodes 9 of the second input switches 7 are out of contact with each other.

Then, in step 02, whether a first input operation is performed, that is to say, whether the surface of the first input sensor 6 is touched with a finger of an operator is determined.

If the determination in step 02 is YES, go to step 03. In step 03, a provisional display is performed, that is to say, input data obtained from an operation of the first input sensor 6 are converted into output data and displayed provisionally on the display portion 5a of the display panel 5. Then go to step 04.

For example, as shown in FIG. 8, in the case where a finger of the operator touches the "7" key 12a of the key sheet 12, output data for provisionally displaying "7" are produced based on the programs and data stored in the memory 15. By the output data, a blinking "7" is displayed provisionally on the display portion 5a of the display panel 5. The position of the displayed "7" in the display portion 5a corresponds to the position of the "7" key 12a in the key sheet 12.

When the operator moves his or her finger to another key, input data corresponding to the key is displayed provisionally.

The provisional display may be selected from blinking, difference in luminance, and difference in color.

If the determination in step 02 is NO, the initial state is kept until a first input operation is performed.

Then, step 04 determines whether a second input operation is performed, that is to say, whether the second input switch 7 is pressed with a finger of the operator and a movable electrode 9 comes into contact with a fixed electrode 8 as shown in FIG. 4.

If the determination in step 04 is YES, go to step 05. In step 05, a final display is performed, that is to say, the input data are confirmed by an operation of the second input switch 7 and then the method terminates. The confirmation of the input data is performed by changing the provisional display into a final display based on the programs and data stored in the memory 15. That is to say, the blinking "7" shown in FIG. 8 is changed into an unblinking "7" shown in FIG. 9. It is preferable to let the operator know that the input is confirmed by a sound such as a bleep in addition to the display.

In the case where the provisional display and the final display are distinguished by difference in luminance, it is preferable that the provisional display have high luminance and the final display have low luminance.

In the case where the provisional display and the final display are distinguished by difference in color, it is preferable that the provisional display be in one of the three primary colors, black, or white and the final display be in the other colors.

If the determination in step 04 is NO, the provisional display is kept until a new first input operation is performed. In one example, when the first input operation is performed, a number which is detected by the first input sensor 6 is provisionally displayed until the second input operation is performed. If the operator moves his finger on the key sheet 12 before the second input operation is performed to select a new number, the new number corresponding to the finger position on the key sheet is provisionally displayed until the second input operation is performed and the original number is disregarded.

Since an operator is given feedback by provisionally displaying input data obtained from a first input operation of the first input sensor 6 on the display portion 5a of the display panel 5 and then the input is confirmed by a second input operation of the second input switch 7, the operator can know the unconfirmed input data in advance by the provisional display. Therefore, inputting errors are prevented surely and easily.

With the inputting method and the input device 1 of this embodiment, the operator can perform a correct input operation surely and easily.

In the coordinate input mode, the second input switch 7 under, for example, the "#" key is used as an input-confirming switch. Based on the track of movement of a finger and the like on the first input sensor 6, output data for provisionally displaying the track are produced. By the output data, the track is displayed provisionally by blinking on the display portion 5a of the display panel 5. Then, by pressing the "#" key, the input is confirmed and the provisional display on the display portion 5a is changed into a final display.

As described above, a coordinate input into the first input sensor 6 as the first input unit is confirmed with a single second input switch 7.

Figure 10:
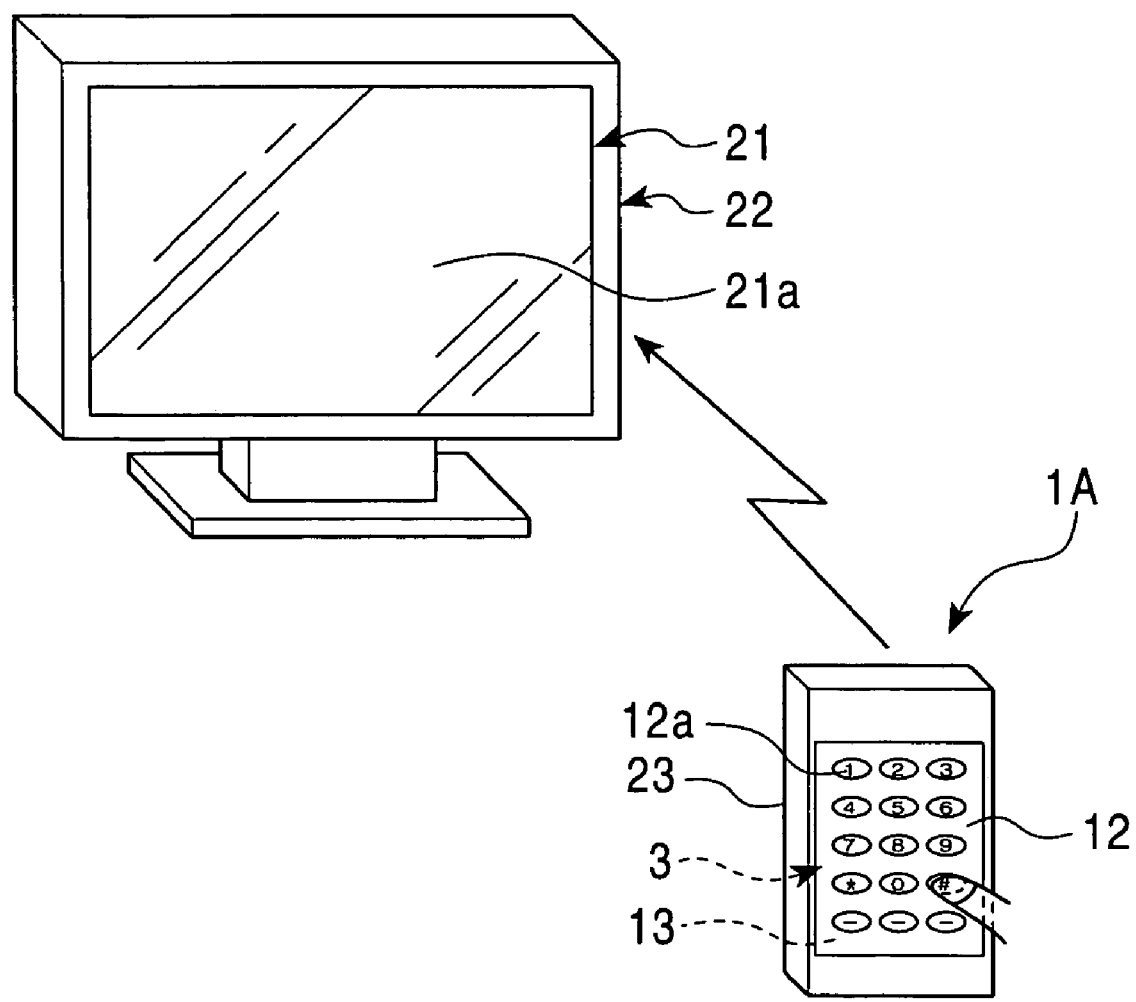
FIG. 10 is an external view of the main part of a second embodiment of an input device to which an inputting method of the present invention is applied.
Figure 11:
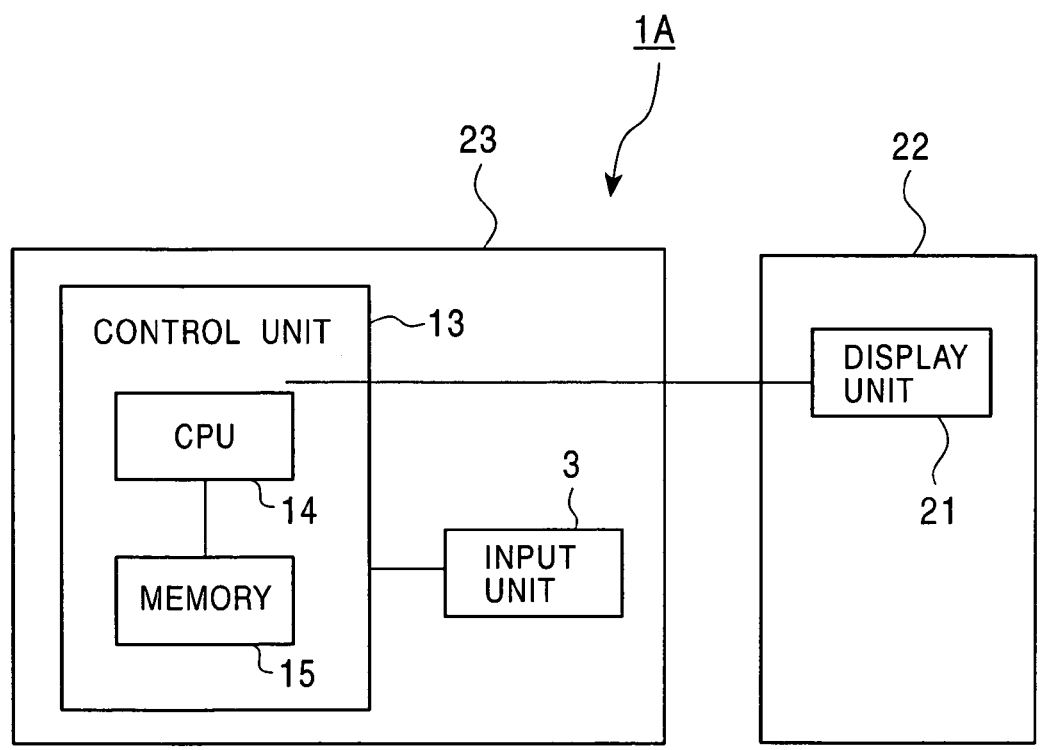
FIG. 11 is a functional block diagram of the input device of FIG. 10.

FIGS. 10 and 11 show a second embodiment of an input device to which an inputting method of the present invention is applied. FIG. 10 is an external view of the main part. FIG. 11 is a functional block diagram. Incidentally, the same reference numerals will be used to designate the same or similar components as those in the first embodiment, so that the detailed description will be omitted.

In the input device 1A of this embodiment, the display unit 21 is physically separated from the control unit 13, or more specifically, from the first input sensor 6 as a first input unit, the second input switch 7 as a second input unit, and the control unit 13.

That is to say, as shown in FIGS. 10 and 11, the input device 1A of this embodiment is a remote control for input operation of an output device 22 with a display unit 21 such as a television. A remote control main body 23 of the input device 1A has the same input unit 3 and the same control unit 13 as the input device 1 of the first embodiment. However, the remote control main body 23 does not have the same display unit 2 as the input device 1 of the first embodiment. The remote control main body 23 and the output device 22 are connected via a known transmission line such as a wireless transmission using infrared rays or radio waves, and a wired transmission using a cable. In the case of a wireless transmission, each of the remote control main body 23 and the output device 22 is provided with a predetermined communication unit.

The display unit 21 of the output device 22 functions as the display unit 2 of the input device 1 of the first embodiment. In the display portion 21a of the display unit 21, in addition to the display of a predetermined output picture, a provisional display of input data obtained from a first input operation and a final display by a second input operation are performed as in the display unit 2 of the input device 1 of the first embodiment.

Incidentally, it is preferable that the output device 22 have a superimposing circuit to superimpose the provisional display and the final display on the output picture.

The output device 22 may have a dedicated display unit for the provisional display and the final display.

Since the other components are the same as the input device 1 of the first embodiment, the detailed description will be omitted.

The input device 1A of this embodiment has the same advantages as the input device 1 of the first embodiment. In addition, the existing output device 22 can be used for the input operation of the input device 1A without making major changes to the existing output device 22.

The present invention is not intended to be limited to the above-described embodiments, and, if necessary, various changes may be made therein.

What is claimed is:

1. An inputting method to input data with a flat first input unit including a capacitance sensor or a pressure sensor and capable of coordinate input, at least one second input unit disposed behind the first input unit and switchable by pressing force when the first input unit is pressed, a control unit controlling each unit in the input device, and a display unit being integrated with or separated from the control unit, the inputting method comprising:

determining whether a first input operation of touching a surface of the first input unit was performed;

displaying, if the first input operation was performed, a provisional display of input information associated with an input region touched in the first input operation;

continuously displaying the provisional display such that, if the touched position on the surface of the first input unit was moved, the provisionally displayed input information is changed to input information associated with a newly touched input region;

determining if a second input operation was operated by a pressing force when the first input unit is pressed; and executing a final display if the second input operation was performed, wherein the input data is confirmed by the second input operation.

2. The inputting method according to claim 1, comprising:

performing a first input operation by operating a switch; and performing a second input operation by operating a switch.

3. The inputting method according to claim 1, wherein the position of the provisional display on the display unit corresponds to the touched position on the surface of the flat first input unit.

* * * * *